(12) United States Patent
Dimitrov et al.

(10) Patent No.: US 9,779,533 B2
(45) Date of Patent: Oct. 3, 2017

(54) HIERARCHICAL TILED CACHING

(71) Applicant: NVIDIA CORPORATION, Santa Clara, CA (US)

(72) Inventors: Rouslan Dimitrov, Santa Clara, CA (US); Ziyad S. Hakura, Gilroy, CA (US)

(73) Assignee: NVIDIA Corporation, Santa Clara, CA (US)

( * ) Notice: Subject to any disclaimer, the term of this patent is extended or adjusted under 35 U.S.C. 154(b) by 352 days.

(21) Appl. No.: 14/164,441

(22) Filed: Jan. 27, 2014

(65) Prior Publication Data
US 2015/0213638 A1 Jul. 30, 2015

(51) Int. Cl.
| | |
|---|---|
| *G09G 5/00* | (2006.01) |
| *G06T 15/00* | (2011.01) |
| *G06T 1/60* | (2006.01) |
| *G06T 11/40* | (2006.01) |

(52) U.S. Cl.
CPC .............. *G06T 15/005* (2013.01); *G06T 1/60* (2013.01); *G06T 11/40* (2013.01)

(58) Field of Classification Search
None
See application file for complete search history.

(56) References Cited

U.S. PATENT DOCUMENTS

| | | | | |
|---|---|---|---|---|
| 6,362,825 | B1 * | 3/2002 | Johnson | G06T 15/005 345/520 |
| 9,177,351 | B2 * | 11/2015 | Goel | G06T 1/20 |
| 2014/0267259 | A1 * | 9/2014 | Frascati | G06T 15/005 345/423 |
| 2014/0306971 | A1 * | 10/2014 | Frascati | G06T 11/40 345/522 |

* cited by examiner

*Primary Examiner* — M Good Johnson
(74) *Attorney, Agent, or Firm* — Artegis Law Group, LLP

(57) ABSTRACT

One embodiment of the present invention includes a method for processing graphics objects. The method includes receiving a first draw-call and a second draw-call. The method also includes dividing the first draw-call into a first set of sub-draw-calls and the second draw-call into a second set of sub-draw-calls. The method further includes identifying a first screen tile. The method also includes identifying a first group of sub-draw-calls included in the first set of sub-draw-calls that overlap the first screen tile and a second group of sub-draw-calls included in the second set of sub-draw-calls that overlap the second screen tile. The method further includes causing the first group of sub-draw-calls and the second group of sub-draw-calls to be processed together.

25 Claims, 11 Drawing Sheets

HIERARCHICAL TILED CACHING

BACKGROUND OF THE INVENTION

Field of the Invention

Embodiments of the present invention relate generally to graphics processing and, more specifically, to hierarchical tiled caching.

Description of the Related Art

Some graphics subsystems implement a tiling architecture in which a render target is divided into partitions referred to as "tiles." Some tile-based systems also store data in an on-chip cache memory during rendering, which increases performance and reduces memory bandwidth consumption. In such systems, primitives are rearranged based on which tile the primitives overlap. For improved performance, multiple processing entities also may be implemented to process the tiles in parallel.

Generally speaking, in the above approach, the different tiles are processed in order, which results in data being loaded into the on-chip cache memory in a tile-by-tile order. Each cache tile is associated with a subset of screen-space and thus a subset of the memory addresses that store pixel data for the screen-space. Therefore, by processing data in the tile-by-tile order, a relatively small subset of data is resident in the cache memory at any one time. Further, most accesses to any particular subset of data occur while that data is resident in the cache memory, since data for each tile are processed together. Therefore, the number of cache misses that occur is reduced as compared with a system that does not process data in cache tile order.

One drawback to the tiling techniques described above, however, is that such techniques do not reduce the number of cache misses that occur when the set of rearranged primitives does not include primitives that overlap in screen-space. In some instances, data that is rearranged does not contain many or any primitives that overlap in screen space. One such instance is when an application program transmits instructions to draw primitives on an object-by-object basis, where objects are application-specified models (such as cars, people, and the like). In such instances, the data that is rearranged may include only a part of such a model, especially if the model includes a very large number of primitives, and the rearrangement process is limited in terms of the number of primitives that can be handled. However, when the number of primitives that overlap is low, the benefits associated with performing multiple operations on a single pixel without causing a cache miss do not exist. These benefits do not exist because only operations for a single pixel are performed when data for one tile is loaded into the cache.

As the foregoing illustrates, what is needed in the art is an improved technique for tiled caching.

SUMMARY OF THE INVENTION

One embodiment of the present invention includes a method for processing graphics objects. The method includes receiving a first draw-call and a second draw-call. The method also includes dividing the first draw-call into a first set of sub-draw-calls and the second draw-call into a second set of sub-draw-calls. The method further includes identifying a first screen tile. The method also includes identifying a first group of sub-draw-calls included in the first set of sub-draw-calls that overlap the first screen tile and a second group of sub-draw-calls included in the second set of sub-draw-calls that overlap the second screen tile. The method further includes causing the first group of sub-draw-calls and the second group of sub-draw-calls to be processed together.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
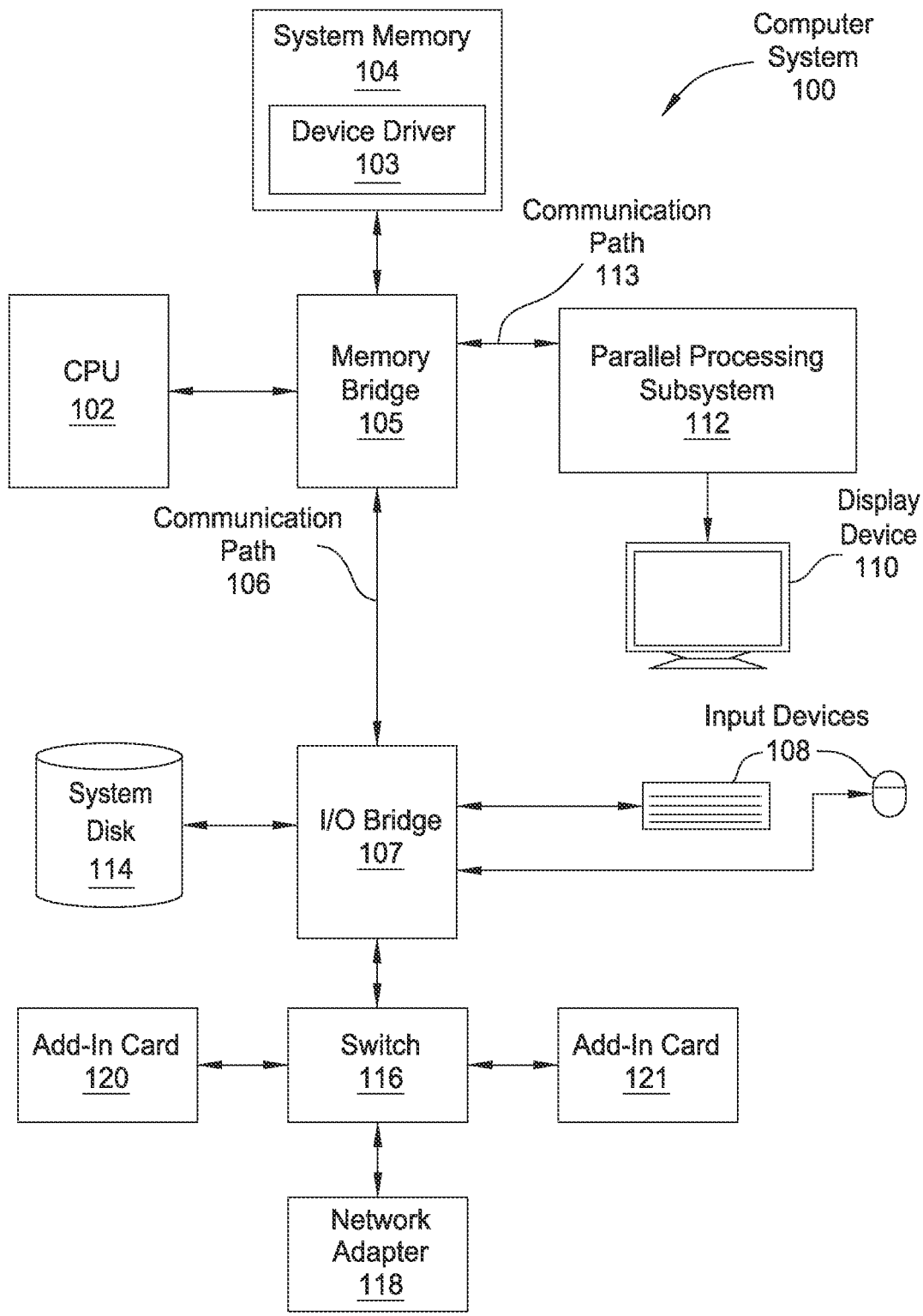
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
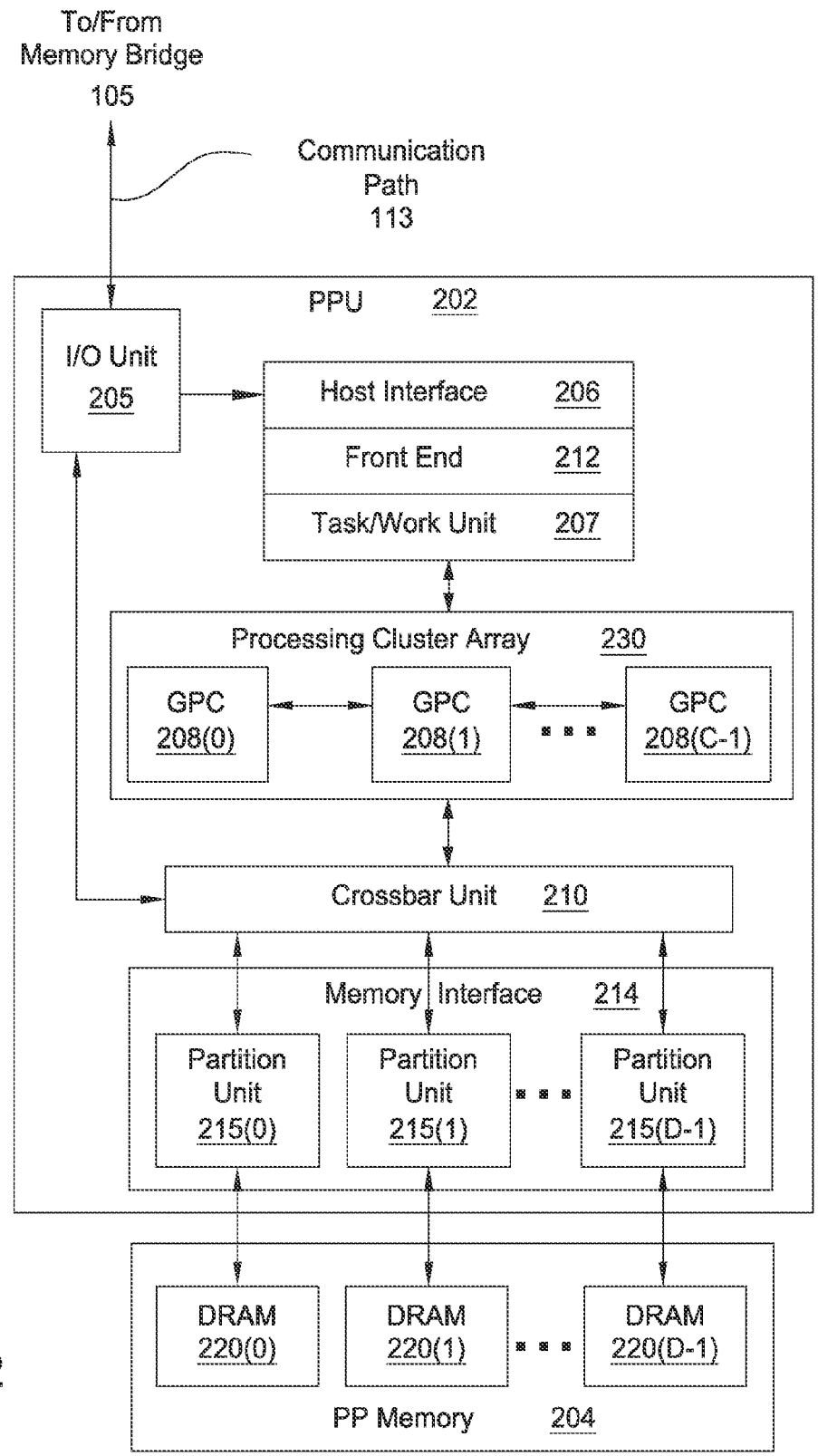
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D 1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
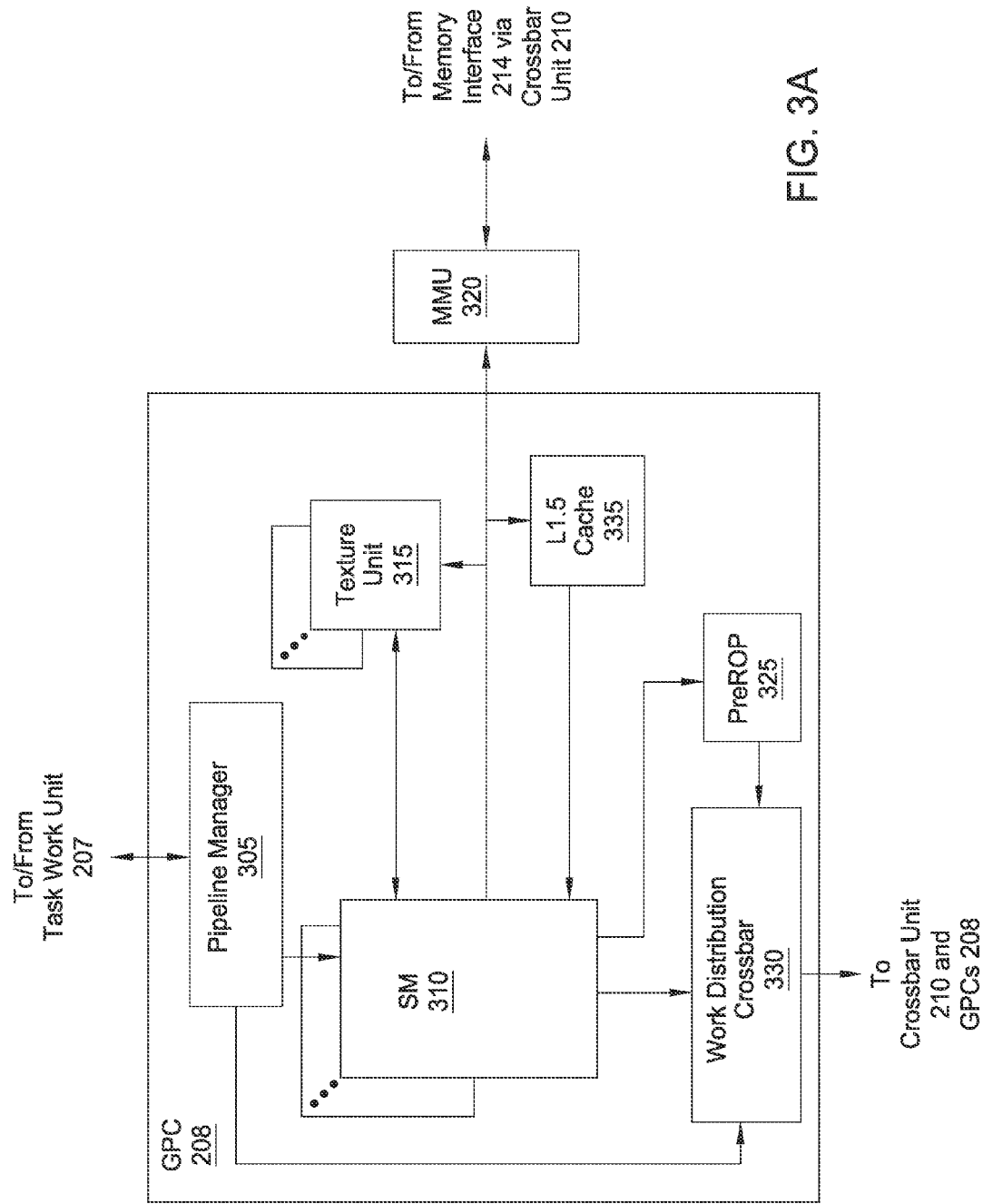
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
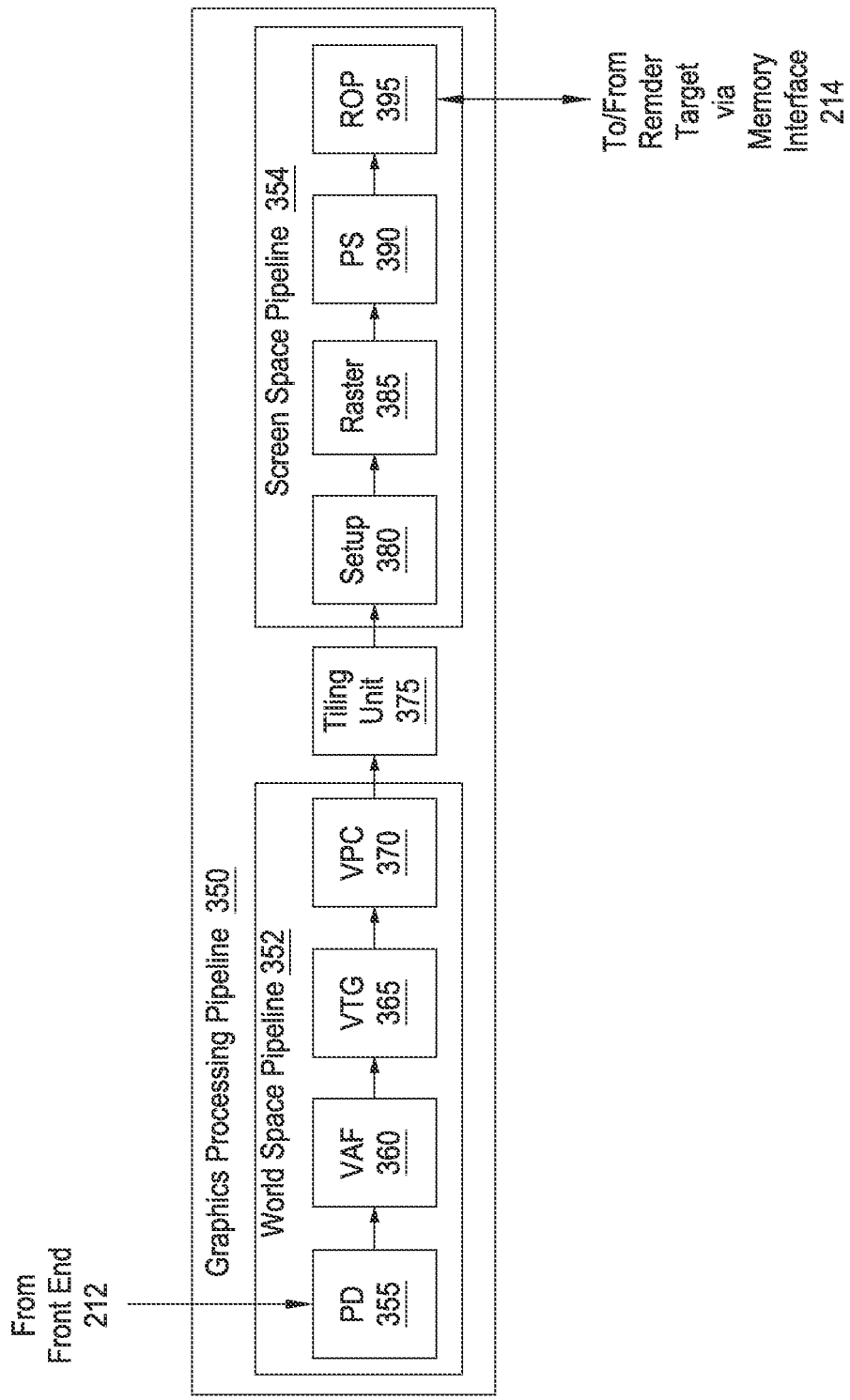
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360, and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
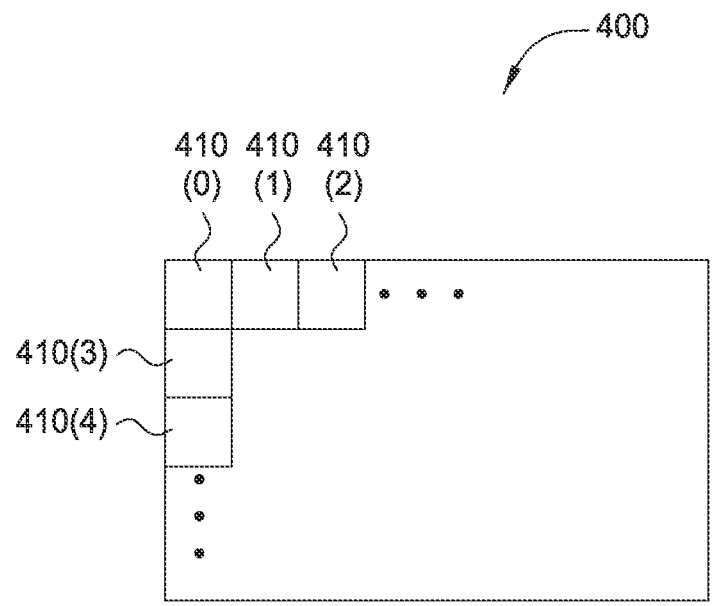
FIG. 4 is a conceptual diagram of a cache tile that the graphics processing pipeline of FIG. 3B may be configured to generate and process, according to one embodiment of the present invention.

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Figure 5:
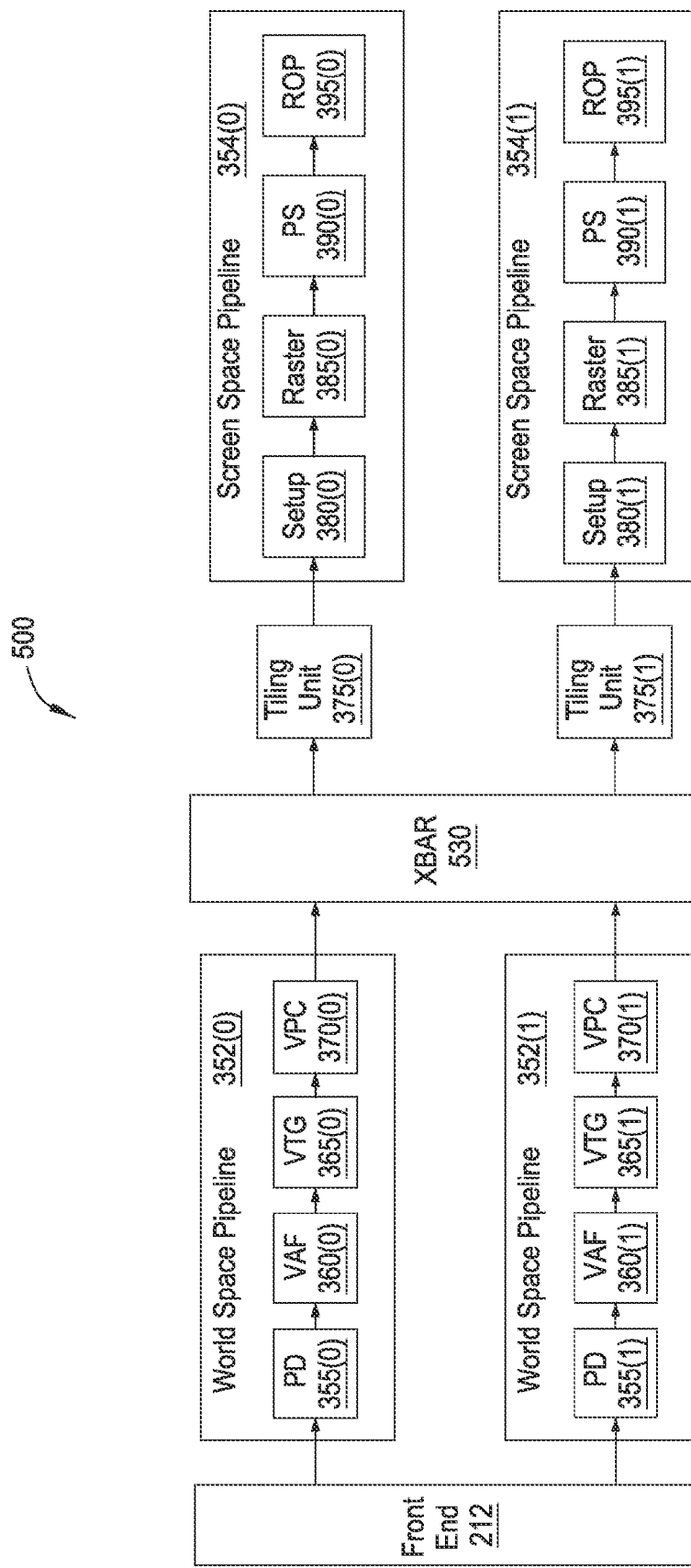
FIG. 5 is a block diagram of a graphics subsystem configured to implement cache tiling, according to one embodiment of the present invention.

FIG. 5 illustrates a graphics subsystem configured to implement cache tiling, according to one embodiment of the present invention. As shown, the graphics subsystem 500 includes a front end unit 212, a first world-space pipeline 352(0), a second world-space pipeline 352(1), a crossbar unit 530 ("XBAR"), a first tiling unit 375(0), a second tiling unit 375(1), a first screen-space pipeline 354(0), and a second screen-space pipeline 354(1).

The graphics subsystem 500 includes at least two instances of the screen-space pipeline 354 and the world-space pipeline 352, for increased performance. The graphics subsystem 500 also includes a crossbar unit 530 for transmitting work output from the first world-space pipeline 352(0) and the second world-space pipeline 352(1) to the first tiling unit 375(0) and the second tiling unit 375(1). Although depicted in FIG. 5 with two instances of the world-space pipeline 352 and the screen-space pipeline 354, the teachings provided herein apply to graphics pipelines having any number of world-space pipelines 352 and screen-space pipelines 354.

The functionality of the world-space pipelines 352 and the screen-space pipelines 354 are implemented by processing entities such as general processing clusters (GPC) 208, described above. In one embodiment, the first world-space pipeline 352(0) may be implemented in a first GPC 208(0) and the second world-space pipeline 352(1) may be implemented in a second GPC 208(1). As a general matter, each screen-space pipeline 352 may be implemented in a different GPC 208, and in a similar fashion, each world-space pipeline 354 may be implemented in a different GPC 208. Further, a given GPC 208 can implement a world-space pipeline 354 and also a screen-space pipeline 352. For example, the first GPC 208(0) may implement both the first world-space pipeline 352(0) and the first screen-space pipeline 354(0). In embodiments that include more than one screen-space pipeline 354, each screen-space pipeline 354 is associated with a different set of raster tiles 420 for any particular render target.

Each of the pipeline units in the world-space pipelines 352 (i.e., primitive distributor 355, vertex attribute fetch unit 360, vertex, tessellation, geometry processing unit 365, and viewport scale, cull, and clip unit 370) and in the screen-space pipelines 354 (i.e., setup 380, rasterizer 385, pixel shader 390, and ROP 395) depicted in FIG. 5 functions in a similar manner as described above with respect to FIGS. 1-4.

A device driver 103 transmits instructions to the front end unit 212. The instructions include primitives arranged in application-programming-interface order (API order). API order is the order in which the device driver 103 specifies that the commands should be executed and is typically specified by an application executing on CPU 102. For example, an application may specify that a first primitive is to be drawn and then that a second primitive is to be drawn.

When the front end unit 212 receives the instructions from the device driver 103, the front end unit 212 distributes tasks associated with the instructions to the world-space pipelines 352 for processing. In one embodiment, the front end unit 212 assigns tasks to the first world-space pipeline 352(0) and the second world-space pipeline 352(1) in round-robin order. For example, the front end unit 212 may transmit tasks for a first batch of primitives associated with the instructions to the first world-space pipeline 352(0) and tasks for a second batch of primitives associated with the instructions to the second world-space pipeline 352(1).

The first world-space pipeline 352(0) and second world-space pipeline 352(1) each process tasks associated with the instructions, and generate primitives for processing by the first screen-space pipeline 354(0) and the second screen-space pipeline 354(1). The first world-space pipeline 352(0) and second world-space pipeline 352(1) each include a bounding box generator unit (not shown) that determines to which screen space pipeline—the first screen-space pipeline 354(0) or the second screen-space pipeline 354(1)—each primitive should be transmitted. To make this determination, the bounding box generator unit generates bounding boxes for each primitive, and compares the bounding boxes to raster tiles 420. If a bounding box associated with a primitive overlaps one or more raster tiles associated with a particular screen-space pipeline 354, then the bounding box generator unit determines that the primitive is to be transmitted to that screen-space pipeline 354. A primitive may be transmitted to multiple screen-space pipelines 354 if the primitive overlaps raster tiles 420 associated with more than one screen-space pipeline 354. After the world-space pipelines 352 generate the primitives, the world-space pipelines 352 transmit the primitives to the crossbar unit 530, which transmits the primitives to the corresponding tiling units 375 as specified by the bounding box generator unit.

The tiling units 375 receive primitives from the crossbar unit 530. Each tiling unit 375 accepts and stores these primitives until the tiling unit 375 decides to perform a flush operation. Each tiling unit 375 decides to perform a flush operation when one or more resource counters maintained by the tiling units 375 indicates that a resource has exceeded a threshold. Each tiling unit 375 may also perform a flush operation upon receiving a command from upstream in the graphics processing pipeline 500 requesting that the tiling unit 375 perform a flush operation. Such a command is referred to herein as a "flush-tiling-unit command." The device driver 103 may transmit the flush-tiling-unit command to the graphics processing pipeline 500 in situations that the device driver 103 deems appropriate.

Upon receiving primitives, a tiling unit 375 updates several resource counters associated with the primitives. The resource counters are configured to track the degree of utilization of various resources associated with the primitives received by the tiling units 375. Resources are either global resources or local resources. Global resources are pools of resources that are shared by all screen-space pipelines 354 and world-space pipelines 352. Local resources are resources that not shared between screen-space pipelines 354 or between world-space pipelines 352. Several examples of local and global resources are now provided.

One type of local resource is a primitive storage space for storing primitives in a tiling unit 375. Each tiling unit 375 includes a primitive storage space that is maintained independently of primitive storage space for other tiling units 375. When a tiling unit 375 receives a primitive, some of the primitive storage space is occupied by the primitive. Because only a limited amount of primitive storage space exists for each tiling unit 375, exceeding a threshold amount of storage space in a particular tiling unit 375 causes the tiling unit 375 to perform a flush operation.

One type of global resource is a vertex attribute circular buffer. The vertex attribute circular buffer includes circular buffer entries that include vertex attributes. The vertex attribute circular buffer is available to units in the graphics subsystem 500 for reading vertex attributes associated with primitives. Each circular buffer entry in the vertex attribute circular buffer occupies a variable amount of storage space. Each tiling unit 375 maintains a count of the amount of space occupied by circular buffer entries associated with primitives in the tiling unit 375.

In one embodiment, the vertex attribute circular buffer may be structured as a collection of smaller per-world-space-pipeline circular buffers. Each per-world-space pipeline circular buffer is associated with a different world-space pipeline 352. If memory space associated with any of the per-world-space-pipeline circular buffers exceed a threshold value, then the associated tiling unit performs a flush operation.

Another type of global resource is a pool of constant buffer table indices. At the application-programming-interface level, an application programmer is permitted to associate constants with shader programs. Different shader programs may be associated with different constants. Each constant is a value that may be accessed while performing computations associated with the shader programs. The pool of constant buffer table indices is a global resource by which constants are associated with shader programs.

When a tiling unit 375 performs a flush operation, the tiling unit 375 iterates through all of the cache tiles 410, and for each cache tile 410, generates a cache tile batch that includes primitives that overlap the cache tile 410, and transmits the cache tile batches to the associated screen-space pipeline 354. Each tiling unit 375 is associated with a different screen-space pipeline 354. Thus, each tiling unit 375 transmits cache tile batches to the associated screen-space pipeline 354.

The tiling unit 375 transmits these cache tile batches to the screen-space pipeline 354 associated with the tiling unit as the cache tile batches are generated. The tiling unit 375 continues to generate and transmit cache tile batches in this manner for all cache tiles 410 associated with a render target. In one embodiment, the tiling unit 375 determines which primitives overlap a cache tile 410 by comparing a border of the cache tile 410 with bounding boxes associated with the primitives and received from the bounding box unit.

The cache tile batches flow through the screen-space pipelines 354 in the order in which the tiling unit 375 generates the cache tile batches. This ordering causes the units in the screen-space pipelines 354 to process the primitives in cache tile order. In other words, the screen-space pipelines 354 process primitives that overlap a first cache tile, and then process primitives that overlap a second cache tile, and so on.

Conceptually, each cache tile batch can be thought of as beginning at the point in time at which the tiling unit 375 began accepting primitives after the previous flush operation. In other words, even though the cache tile batches are transmitted to and processed by the screen-space pipelines 354 sequentially, each cache tile batch logically begins at the same point in time. Of course, because the cache tiles do not overlap in screen space, sequential processing in this manner generally produces the desired results.

Hierarchical Tiled Caching

When each cache tile batch is processed, data for that cache tile is loaded into an on-chip memory such as an L2 cache. By processing data in a tile-by-tile order, a relatively small subset of data is resident in the cache memory. Because a small subset of data is resident in cache memory at any one time, the number of cache misses that occur is reduced as compared with a system that does not process data in cache tile order. The number of cache misses that occur is reduced because each section of the screen-space memory is processed in temporal proximity and thus processing for particular cache tiles occur within the same time period.

The process of rearranging the data into cache tile order generally benefits when each flush operation captures many primitives that overlap in screen-space. This benefit occurs because in such situations, the screen-space pipeline performs multiple operations on each individual pixel stored in the cache memory without causing cache misses. In some instances, however, flush operations may capture few or no primitives that overlap. One such instance is when an application program transmits instructions to draw primitives on an object-by-object basis, where objects are application-specified models (such as cars, people, and the like).

In such an instance, only primitives associated with parts of an object that face the camera are transmitted to the tiling unit (due to back-face culling operations, as is generally know to those of ordinary skill in the art), and these primitives generally do not overlap (although these primitives may overlap to some degree). Because each object may have a large number of primitives, which may cause the tiling units to perform a flush operation, only a subset of primitives associated with a single object are received by the tiling units in a single flush operation. Thus, when an application program and/or driver 103 transmit primitives object-by-object, each flush operation may not include multiple primitives that overlap, or may include very few primitives that overlap.

Figure 6:
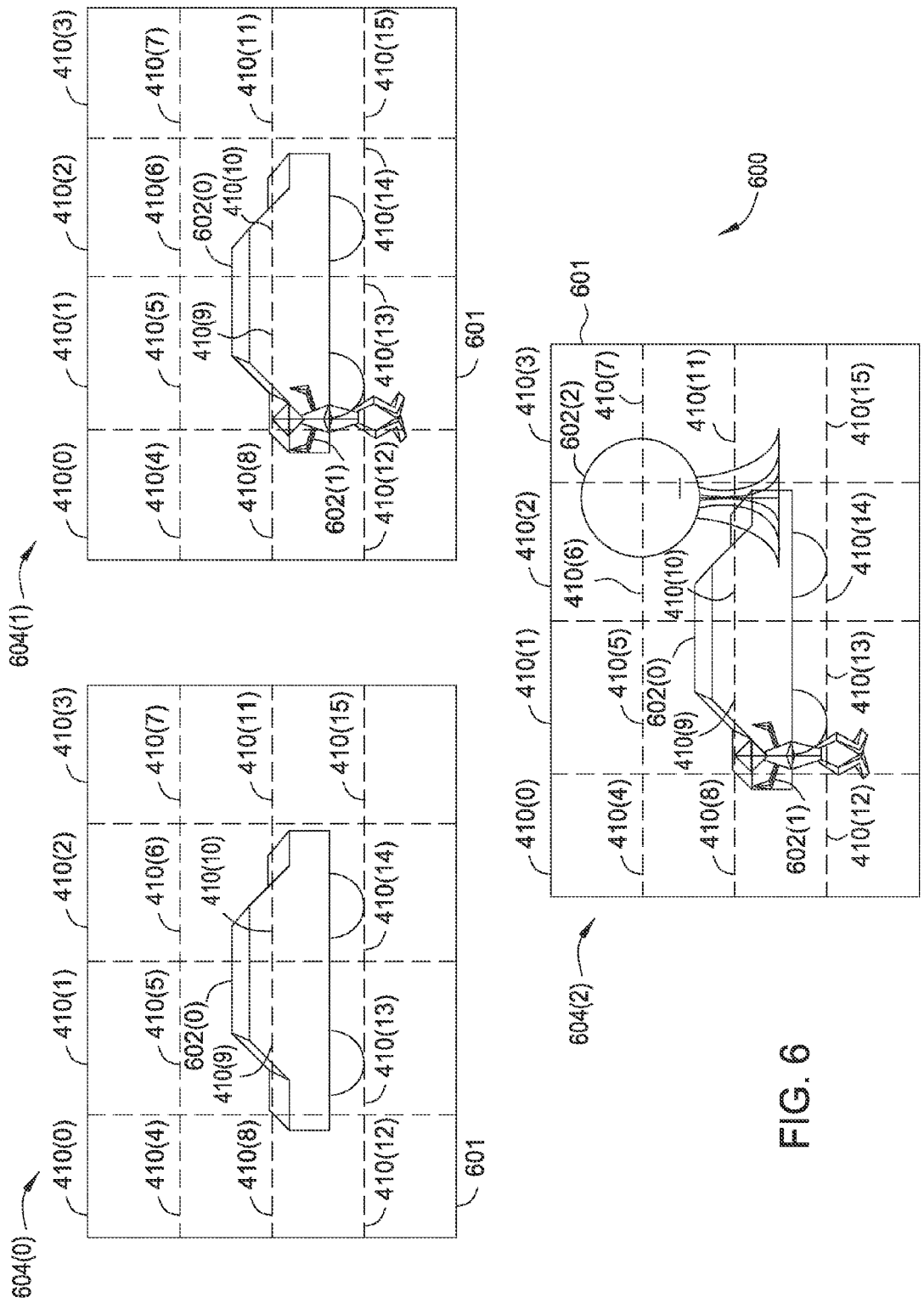
FIG. 6 illustrates a sequence of operations associated with processing several objects on a tile-by-tile basis, according to one embodiment of the present invention.

FIG. 6 illustrates a sequence of operations associated with processing several objects on a tile-by-tile basis, in accordance with one embodiment of the present invention. As shown, the sequence 600 illustrates rendering states 604 that illustrate various objects 602 drawn to a render target 601. As described above with respect to FIGS. 4 and 5, the render target 601 is divided into cache tiles 410. The sequence of operations includes a first render state 604(0) associated with a first object 602(0), a second render state 604(1) associated with a second object 602(1), and a third render state 604(2) associated with a third object 602(2).

In operation, an application program generates commands to draw the objects 602 and transmits these commands to a driver 103. Each set of commands that configured to draw a single object is referred to herein as a "draw-call." The driver 103 forwards these commands to the graphics subsystem 500 for rendering. Oftentimes, an application program generates commands to draw the objects 602 in an object-by-object order. More specifically, the application program generates commands to draw a first object, such as object 602(0), commands to draw a second object, such as object 602(1), and commands to draw a third object, such as object 602(2).

When the graphics subsystem 500 receives the commands to draw the objects 602, the world-space pipelines 352 in the graphics subsystem 500 perform associated operations, such as vertex shading, as described above with respect to FIGS. 1-5, and transmit primitives to the crossbar unit 530. The crossbar unit 530 transmits the primitives to the tiling units 375, also as described above with respect to FIGS. 1-5. The world-space pipelines 352 generally transmit the primitives to the crossbar unit 530 in application-programming-interface-order (API order), and the crossbar unit 530 preserves this order when the crossbar unit 530 transmits the primitives to the tiling units 375 for tiling operations. API order is the order in which the application programs transmits the commands to draw the objects to the driver 103. With the particular group of objects 602 depicted in FIG. 6, API order means the following order: primitives associated with the first object 602(0), then primitives associated with the second object 602(1), then primitives associated with the third object 602(2).

As described above with respect to FIG. 5, the tiling units 375 operate in a "buffer-limited manner." More specifically, the tiling units 375 are associated with a limited amount of memory for storing received primitives. When this limited amount of memory is filled, a tiling unit 375 performs a flush operation, and generates cache tile batches for transmittal to the screen-space pipelines 354 for processing.

In many instances, individual drawing objects 602 include more primitives than are able to be fit into the memory associated with a tiling unit 375. In those instances, tiling units 375 will often only be able to store primitives associated with a single drawing object 602 in the associated memory for storing received primitives. As described above, the tiling unit 375 provides benefit in terms of memory access latency reduction (reduced cache misses) when many primitives in a single flush operation overlap in screen-space. Because primitives from a single drawing object 602 generally do not overlap to a large degree in screen-space, and because a single drawing object 602 may be associated with more primitives than can fit into the memory associated with a tiling unit 375, benefits associated with tiling operations may not be realized in certain situations as described.

As further illustration of these concepts, reference is now made to the sequence of render states 604 illustrated in FIG. 6. A first render state 604(0) depicts a particular state after object 602(0) is drawn. As described above, object 602(0) includes multiple primitives. In an example operation, tiling unit 375 receives primitives associated with one half of the object 602(0) and then performs a flush operation because the memory associated with storing primitives for that tiling unit 375 has become full. During the flush operation, the tiling unit 375 generates and transmits the cache tile batches to the screen-space pipelines 354 for processing. More specifically, the tiling unit 375 traverses each cache tile 410 and determines which primitives overlap that particular cache tile.

In the example flush operation, the tiling unit 375 determines that no primitives overlap cache tile 410(0), cache tile 410(1), cache tile 410(2), cache tile 410(3), and cache tile 410(4). Tiling unit 375 determines that some primitives overlap cache tile 410(5), but that no primitives overlap cache tile 410(6), or cache tile 410(7). (Tiling unit 375 has not yet received the primitives from object 602(0) that overlap cache tile 410(6), or cache tile 410(410(10)). Tiling unit 375 determines that some primitives overlap cache tile 410(8) and cache tile 410(9) and generate corresponding cache tile batches. The tiling unit 375 receives additional primitives associated with object 602(0) and not included in the current flush operation and performs a flush operation for those primitives to complete render state 604(0). In a similar manner, the tiling unit 375 receives primitives and performs flush operations to produce render state 604(1) and render state 604(2). As shown, in the flush operation described, the tiling unit 375 only receives a portion of the primitives for drawing object 602(0). Because few or none of these primitives overlap, cache memory benefits associated with tiling described above may not be realized in this situation.

As described above, in many situations, such as when application programs transmit multiple draw-calls that include a large number of primitives for single geometric objects, the operations of the tiling units 375 may not provide substantial advantages for cache memory traffic. In such situations, a technique referred to herein as "screen tiling" and described below with respect to FIGS. 7-10 reorganizes draw-calls received from application programs to assist tiling units 375 in producing benefits related to improving cache memory traffic. More specifically, screen tiling accumulates draw-calls for at least two drawing objects 602, divides these draw-calls into sub-draw-calls that each specifies a subset of the vertices in the draw-calls, and rearranges the sub-draw-calls based on the "screen tiles" that the sub-draw-calls overlap. By combining primitives from multiple drawing objects 602, this technique increases the likelihood that primitives that overlap in screen-space will be included in the same flush operation. The sub-draw-calls may include one or more primitives.

Figure 7:
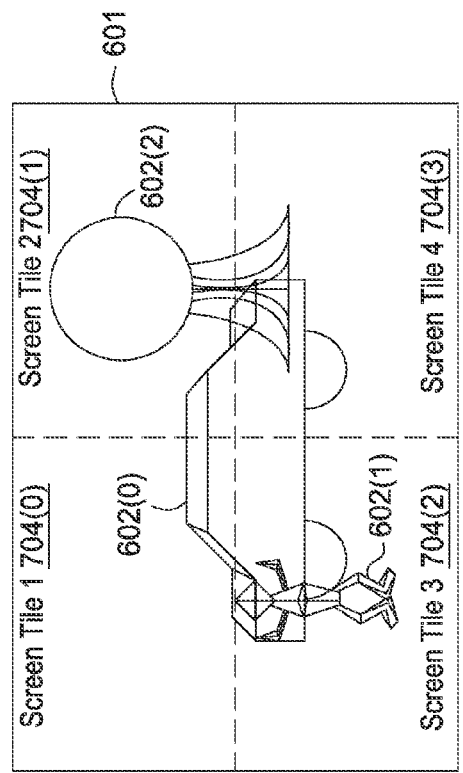
FIG. 7 illustrates how a render target is divided into screen tiles, according to one embodiment of the present invention.
Figure 7:
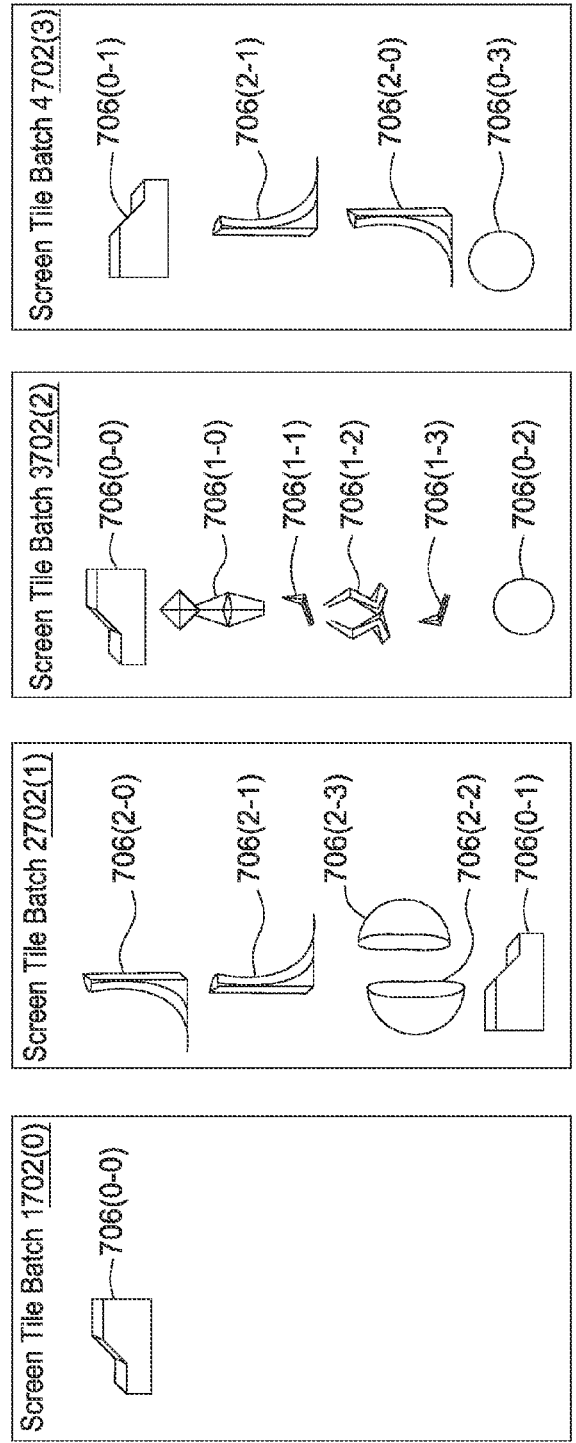

FIG. 7 illustrates how a render target is divided into screen tiles, according to one embodiment of the present invention. As shown, the render target 601 includes a first screen tile 704(0), a second screen tile 704(1), a third screen tile 704(2), and a fourth tile 704(3), as well as associated graphics objects 602. FIG. 7 also illustrates several screen tile batches 702, each of which includes one or more sub-draw-calls that overlap an associated screen tile 704.

Screen tiles 704 represent a portion of render target 601 that primitives associated with sub-draw-calls may overlap. For example screen tile 704(0) represents a top-left portion of render target 601, screen tile 704(3) represents a bottom-right portion of render target 601, and so on. Screen tiles 704 do not necessarily align with the boundaries of cache tiles 410 (although screen tiles 704 may align with such boundaries).

Each screen tile batch 702 is associated with a different screen tile 704. Screen tile batch 702(0) is associated with screen tile 704(0). Screen tile batch 702(1) is associated with screen tile 704(1). Screen tile batch 702(2) is associated with screen tile 704(2). Screen tile batch 702(3) is associated with screen tile 704(3). Each screen tile batch 702 includes sub-draw-calls that overlap the associated screen tile 704.

In the example shown, screen tile batch 702(0) includes sub-draw-call 706(0-0), which includes commands to render primitives that overlap screen tile 702(0). Similarly, screen tile batch 702(1) includes sub-draw-call 706(2-0), sub-draw-call 706(2-1), sub-draw-call 706(2-2), sub-draw-call 706(2-3), sub-draw-call and 706(0-1), each of which includes commands to render primitives that overlap screen tile 704(1). Screen tile batch 3 702(2) and screen tile batch 4 702(3) similarly include sub-draw-calls 706 that overlap corresponding screen tiles 704.

As described above, the driver 103 divides each draw-call into sub-draw-calls and groups together sub-draw-calls into screen tile batches 702. By performing these steps, the tiling units 375 are more likely to receive multiple primitives that overlap within a single cache tile 410 and within a single flush operation. With more primitives that overlap within a single cache tile 410, tiling units 375 are more likely to produce benefits associated with cache memory access time as described above. Processing the sub-draw-calls in this order is referred to herein as "screen-tile-order." FIGS. 8 and 9 illustrate two different techniques by which sub-draw-calls are organized into screen tile batches 702 and rendered.

Figure 8:
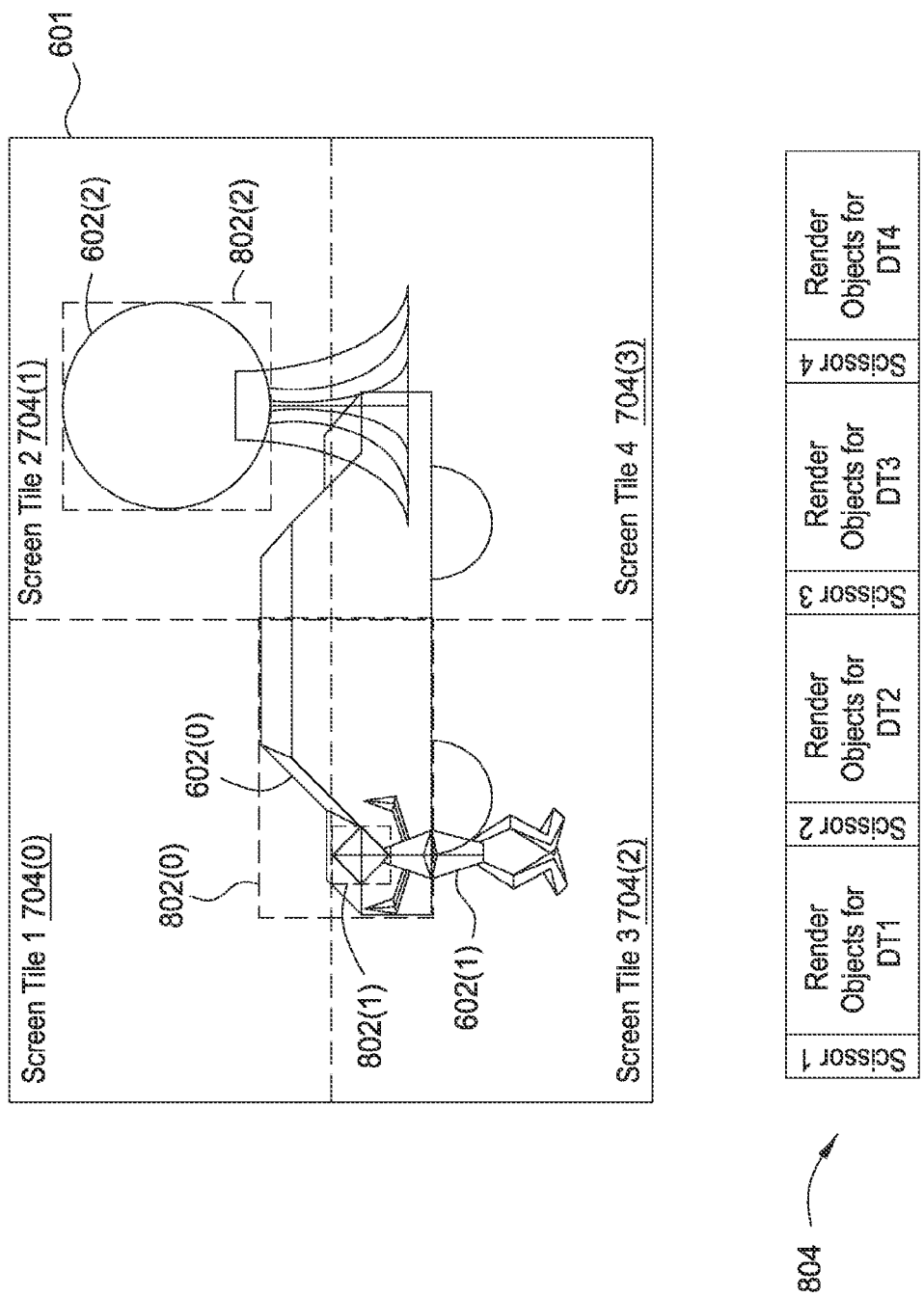
FIG. 8 illustrates how sub-draw-calls are organized into screen tile batches for rendering, according to one embodiment of the present invention.
Figure 9:
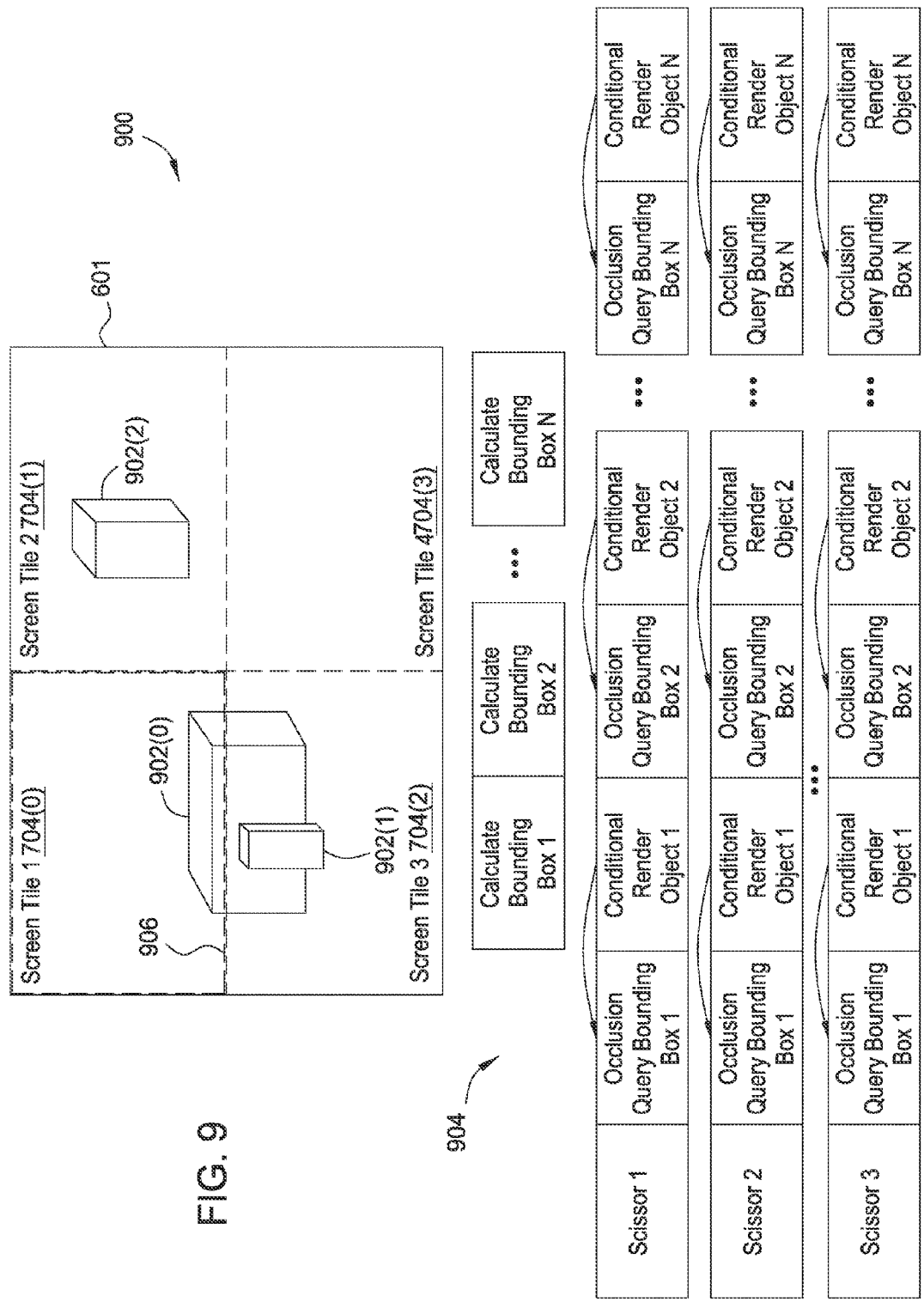
FIG. 9 illustrates how sub-draw-calls are organized into screen tile batches for rendering, according to another embodiment of the present invention.

FIG. 8 illustrates how sub-draw-calls are organized into screen tile batches for rendering, according to one embodiment of the present invention. As shown, FIG. 8 includes a render target 601 and a sequence 804 of commands transmitted to graphics subsystem 500.

The technique described with respect to FIG. 8 is a technique in which the driver 103 performs calculations associated with determining whether sub-draw-calls overlap particular screen tiles 704. Thus, in this technique, the driver 103 receives multiple graphics objects 602, divides each graphics object 602 into sub-draw-calls 706, and calculates bounding boxes for each sub-draw-call. In order to calculate such bounding boxes, the driver 103 performs transformations on the vertices specified by the sub-draw-calls in order to determine screen-space locations for the vertices. More specifically, the driver 103 performs calculations associated with a world transformation and a view transformation. The world transformation translates the coordinates of the vertices in the sub-draw-calls from object space to world space, as is generally known. The view transformation translates the world space coordinates to screen space coordinates, as is also generally known.

Once the driver 103 has determined the screen-space coordinates associated with each of the vertices in the sub-draw-calls, the driver 103 determines bounding boxes for each of the sub-draw-calls. To determine bounding boxes, the driver 103 examines all vertices in a particular sub-draw-call to determine the vertices with the highest and lowest coordinates in both vertical and horizontal directions in screen-space. These highest and lowest coordinates represent the edges of the bounding box for the sub-draw-call. Once the driver 103 has determined the bounding boxes for each of the sub-draw-calls, the driver 103 determines which sub-draw-calls overlap each screen tile 704 by comparing the bounding boxes for the sub-draw-calls to the borders of the screen tile 704.

When the driver 103 has determined which sub-draw-calls overlap each screen tile 704, the driver 103 transmits the sub-draw-calls in screen tile 704 order to the graphics subsystem 500 for rendering. In one embodiment, the driver 103 transmits sub-draw-calls that overlap a first screen tile 704, then sub-draw-calls that overlap a second screen tile 704, and so on. For each screen tile 704, and prior to the sub-draw-calls for that screen tile 704, the driver 103 transmits a scissor command to the graphics subsystem 500. The scissor command is configured to cause the graphics subsystem to only render to a portion of render target 601 specified by the scissor command. For each screen tile 704, the scissor command specifies the portion of the render target 601 covered by the screen tile 704.

For illustration, several bounding boxes 802 and a command stream 804 are shown. Command stream 804 includes scissor rectangles followed by sub-draw-calls. More specifically, the command stream 804 includes a scissor rectangle for a first screen tile 704(0) followed by sub-draw-calls that overlap the first screen tile 704(0), and then a scissor rectangle for a second screen tile 704(1) followed by sub-draw-calls that overlap the second screen tile 704(1), and so on up to the last screen tile 704. As stated above, the scissor rectangle causes the graphics subsystem 500 to draw only to the part of the screen-space specified by the scissor rectangle. As each scissor rectangle specifies a part of the screen-space associated with a particular screen tile 704, the command stream 804 causes the graphics subsystem 500 to draw each screen tile 704 one-by-one.

FIG. 9 illustrates how sub-draw-calls are organized into screen tile batches for rendering, according to another embodiment of the present invention. As shown, FIG. 9 includes a render target 601 and a sequence 904 of commands transmitted to graphics subsystem 500.

The technique described with respect to FIG. 9 is a technique in which the driver 103 requests that the parallel processing subsystem 112 performs operations to determine which sub-draw-calls overlap which screen tiles 704. To cause parallel processing subsystem 112 to make these determinations, the driver 103 receives multiple graphics objects 602, divides these graphics objects 602 into sub-draw-calls, and requests that the parallel processing subsystem 112 perform compute operations to calculate bounding boxes 902 associated with sub-draw-calls. The bounding boxes calculated by the parallel processing subsystem 112 are three-dimensional bounding boxes, in object space, as opposed to two-dimensional bounding boxes in screen-space as described above with respect to FIG. 8. In one embodiment, to calculate these bounding boxes, the parallel processing subsystem 112 determines the highest and lowest coordinates in horizontal, vertical, and z-directions, for the vertices in each sub-draw-call. Additionally, in one embodiment, the driver 103 allocates memory space for each of the bounding boxes and subsequently transmits commands to the parallel processing subsystem 112 to calculate the bounding boxes. The commands to calculate the bounding boxes cause the parallel processing subsystem 112 to write the bounding boxes to the allocated memory spaces for access by the conditional drawing operations described below.

The driver 103 also requests that the graphics subsystem 500 perform conditional drawing operations to draw graphics objects 602 screen tile 704 by screen tile 704. More specifically, for each screen tile 704, the driver 103 transmits a scissor command that specifies a portion of the render target 601 that the screen tile 704 overlaps. For each screen tile 704, the driver 103 also transmits a series of conditional render commands that includes an occlusion query for each sub-draw-call and a corresponding conditional render command for each sub-draw-call. More specifically, the series of conditional render commands includes, for each sub-draw-call, a pair of commands that includes an occlusion query testing the bounding box for the sub-draw-call, and a conditional render configured to conditionally render the sub-draw-call if the occlusion query has a result of true.

Each occlusion query causes the graphics subsystem 500 to test an associated bounding box to determine whether any pixels for the bounding box would be visible within the area of the render target 601 specified by the scissor rectangle. The bounding box is one of the bounding boxes calculated by the GPCs 208 in the compute operations described above. If the occlusion query determines that pixels are visible, then the occlusion query has a result of true, and if no such pixels are visible, then the occlusion query has a result of false.

Each conditional render includes conditional instructions to render primitives associated with a sub-draw-call, based on the results of the associated occlusion query. Each conditional render is conditional on the results of an occlusion query that is associated with the bounding box 902 for the sub-draw-call specified by the conditional render. Further, each conditional render causes the associated sub-draw-call to be rendered only if the associated occlusion query has a result of true. In this manner, the sequence of commands 904 causes the graphics subsystem 500 to render, for each screen tile 702, only the geometry that overlaps that screen tile 702.

In one embodiment, the driver 103 prepares all of the commands to calculate the bounding boxes and the conditional render commands and transmit these commands to the parallel processing subsystem 112 together. The driver 103 may also transmit a command that causes the parallel processing subsystem 112 to wait until all of the bounding boxes are calculated before executing the conditional render commands. When the parallel processing subsystem 112 receives these commands, the parallel processing subsystem 112 calculates the bounding boxes and then executes the conditional render commands to render, for each screen tile, the geometry that overlaps that screen tile.

To illustrate these concepts, several bounding boxes 902 are depicted in FIG. 900. For clarity, the geometry associated with the sub-draw-calls is not depicted in FIG. 9, but the geometry is the same as the geometry depicted in FIGS. 6, 7, and 8. Bounding box 902(0) is associated with sub-draw-call 706(0-0). Bounding box 902(1) is associated with sub-draw-call 706(1-0). Bounding box 902(2) is associated with sub-draw-call 706(2-2). For screen tile 1 704(0), the conditional instructions set a scissor rectangle 906 to correspond to the screen tile 704(0). The conditional instructions also cause the parallel processing subsystem 112 to test whether bounding boxes, such as bounding box 902(0), bounding box 902(1), and bounding box 902(2) are visible within the scissor rectangle 906.

The occlusion query for bounding box 902(0) has a result of true because some of bounding box 902(0) is visible within screen tile 704(0). However, the occlusion query for bounding box 902(1) has a result of false and the occlusion query for bounding box 902(2) also has a result of false. Based on these results, parallel processing subsystem 112 renders, or does not render, the associated sub-draw-calls. Because the result for bounding box 902(0) is true, parallel processing subsystem 112 renders the associated sub-draw-call, which is sub-draw-call 706(0-0), for screen tile 704(0). However, because the results for both bounding box 902(1) and bounding box 902(2) are false, parallel processing subsystem 112 does not render sub-draw-call 706(1-0) or sub-draw-call 706(2-2) for screen tile 704(0).

Only a subset of the sub-draw-calls 706 are described with respect to FIG. 9. In operation, driver 103 would cause occlusion queries and conditional render operations to be performed for all of the sub-draw-calls and for each screen tile 704. More specifically, for every screen tile 704, driver 103 includes an occlusion query and associated render commands for each sub-draw-call that the driver 103 has decided to collect and divide.

Although the occlusion query is described herein as being executed in conjunction with three-dimensional bounding boxes 902 in world-space, the occlusion may alternatively be executed in conjunction with two-dimensional bounding boxes in screen-space.

Figure 10:
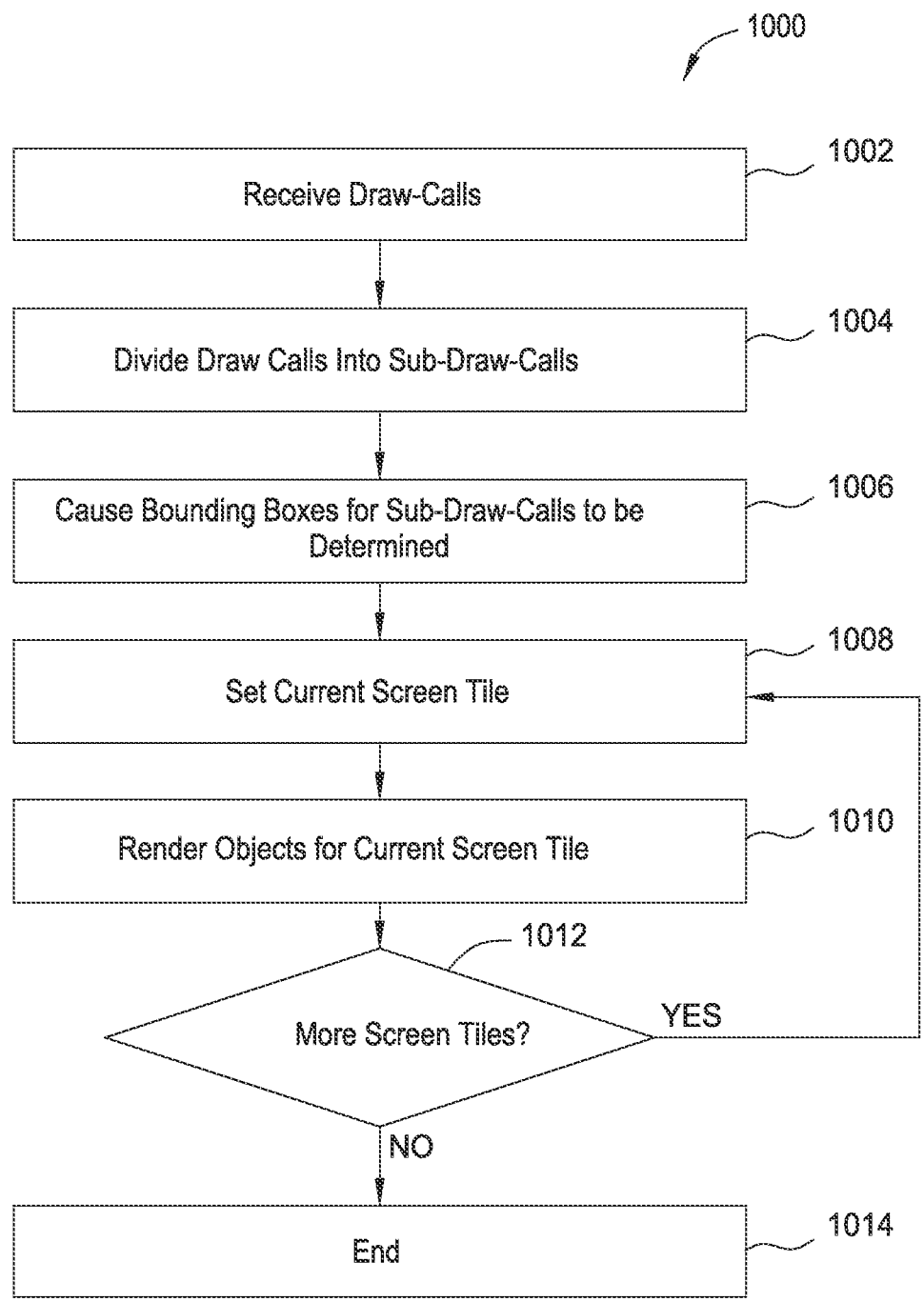
FIG. 10 is a flow diagram of method steps for rendering graphics objects, according to one embodiment of the present invention.

FIG. 10 is a flow diagram of method steps for rendering graphics objects, according to one embodiment of the present invention. Although the method steps are described in conjunction with FIGS. 1-9, persons skilled in the art will understand that any system configured to perform the method steps, in any order, falls within the scope of the present invention.

As shown, a method 1000 begins at step 1002, where driver 103 receives draw-calls from an application program. At step 1004, the driver 103 divides the draw-calls into sub-draw-calls. Each sub-draw-call specifies a subset of the geometry specified by the received draw-calls. At step 1006, the driver 103 determines the bounding boxes for the sub-draw-calls. The driver 103 may either determine the bounding boxes on the CPU 102 or may cause the parallel processing subsystem 112 to determine the bounding boxes for the sub-draw-calls.

In step 1008, the driver 103 sets a current screen tile and renders objects for the current screen tile. If the driver 103 determined the bounding boxes, then the driver 103 determines which sub-draw-calls overlap each screen tile by comparing the bounding boxes to the screen tile borders. If the driver 103 requested that the parallel processing subsystem 112 determine the bounding boxes, then the driver 103 transmits a series of conditional render commands to the graphics subsystem 500 to cause the graphics subsystem 500 to render graphics objects for the current screen tile. In step 1012, the driver 103 determines whether there are more screen tiles to process. If there are more screen tiles to process, then the method returns to step 1008, previously described herein. If there are no more screen tiles to process, then the method terminates.

Although described above as being performed by the driver 103, the "screen tiling" functionality described with respect to FIGS. 6-10 may be performed by a screen tiling hardware unit ("screen tiling unit") located within a GPC 208 or in another location in the parallel processing subsystem 112, instead of by the driver 103.

In sum, a driver receives draw-calls from an application program and divides the draw-calls into sub-draw-calls. The driver causes the bounding boxes for the sub-draw-calls to be determined. In one embodiment, the driver calculates the bounding box. In another embodiment, the driver causes the parallel processing subsystem to calculate the bounding box. For each screen tile, the driver causes only the sub-draw-calls that overlap the screen tile to be rendered. In one embodiment, the driver transmits only the sub-draw-calls that overlap the screen tile to the graphics processing system for processing. In another embodiment, the driver transmits a series of conditional render commands configured to cause the graphics processing system to render only the sub-draw-calls that overlap the screen tile.

One advantage of the disclosed approach is that geometry that overlaps in screen space is tiled together, which reduces the number of cache misses and improves memory access time. Another advantage is that reducing cache misses reduces memory bandwidth consumption which helps to save power and increase processing speed.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for processing graphics objects, the method comprising:
receiving a first draw-call and a second draw-call;
dividing the first draw-call into a first set of sub-draw-calls and the second draw-call into a second set of sub-draw-calls;
identifying a first screen tile;
identifying a first plurality of sub-draw-calls included in the first set of sub-draw-calls that overlap the first screen tile and a second plurality of sub-draw-calls included in the second set of sub-draw-calls that overlap the first screen tile;
storing primitives associated with the first plurality of sub-draw-calls and primitives associated with the second plurality of sub-draw-calls together in a first tiling unit; and
flushing the first tiling unit to transmit the primitives associated with the first plurality of sub-draw-calls and the primitives associated with the second plurality of sub-draw-calls to a screen-space pipeline to be rendered together in the screen-space pipeline.

2. The method of claim 1, wherein flushing the first tiling unit to transmit the primitives associated with the first plurality of sub-draw-calls and the primitives associated with the second plurality of sub-draw-calls to a screen-space pipeline to be rendered together comprises setting a scissor rectangle for the first screen tile.

3. The method of claim 1, wherein identifying the first plurality of sub-draw-calls and the second plurality of sub-draw-calls comprises causing a set of bounding boxes to be determined for each sub-draw-call in the first set of sub-draw-calls and each sub-draw-call in the second set of sub-draw-calls.

4. The method of claim 3, wherein causing the set of bounding boxes to be determined comprises calculating minimum and maximum screen-space coordinates for each vertex in each sub-draw-call in the first set of sub-draw-calls and each sub-draw-call in the second set of sub-draw-calls.

5. The method of claim 4, wherein flushing the first tiling unit to transmit the primitives associated with the first plurality of sub-draw-calls and the primitives associated with the second plurality of sub-draw-calls to a screen-space pipeline to be rendered together further comprises causing a graphics subsystem to determine which sub-draw-calls in the first set of sub-draw-calls and which sub-draw-calls in the second set of sub-draw-calls overlap each bounding box in the set of bounding boxes.

6. The method of claim 3, wherein causing the set of bounding boxes to be determined comprises allocating memory for the set of bounding boxes, causing a graphics subsystem to calculate minimum and maximum object-space coordinates for each vertex in each sub-draw-call in the first set of sub-draw-calls and each sub-draw-call in the second set of sub-draw-calls, and causing the graphics subsystem to write the minimum and maximum object-space coordinates into the allocated memory.

7. The method of claim 6, wherein flushing the first tiling unit to transmit the primitives associated with the first plurality of sub-draw-calls and the primitives associated with the second plurality of sub-draw-calls to a screen-space pipeline to be rendered together further comprises transmitting a set of commands to the graphics subsystem.

8. The method of claim 7, wherein:
the set of commands includes a set of occlusion query commands and a set of conditional render commands,
each occlusion query command included in the set of occlusion query commands is configured to transform a different bounding box included in the set of bounding boxes into screen-space coordinates, and test a different sub-draw-call included in the first set of sub-draw-calls and the second set of sub-draw-calls against the transformed bounding box, and
the set of conditional render commands is configured to cause sub-draw-calls for which the test for an associated bounding box results in true to be rendered.

9. The method of claim 8, wherein the set of conditional render commands is associated with the first screen tile, each occlusion query command is associated with at least one sub-draw-call in the first set of sub-draw-calls or the second set of sub-draw-calls, and each conditional render command is associated with a different occlusion query command.

10. The method of claim 1, wherein flushing the first tiling unit to transmit the primitives associated with the first plurality of sub-draw-calls and the primitives associated with the second plurality of sub-draw-calls to a screen-space pipeline to be rendered together comprises:

identifying a first plurality of primitives that includes primitives associated with the first set of sub-draw-calls that overlap a first cache tile and primitives associated with the second set of sub-draw-calls that overlap the first cache tile;

identifying a second plurality of primitives that includes primitives associated with the first set of sub-draw-calls that overlap a second cache tile and primitives associated with the second set of sub-draw-calls that overlap the second cache tile; and transmitting the first plurality of primitives to the screen-space pipeline for processing prior to transmitting the second plurality of primitives to the screen-space pipeline for processing.

11. A non-transitory computer-readable medium storing instructions that, when executed by a processor, cause the processor to execute the steps of:

receiving a first draw-call and a second draw-call;

dividing the first draw-call into a first set of sub-draw-calls and the second draw-call into a second set of sub-draw-calls;

identifying a first screen tile;

identifying a first plurality of sub-draw-calls included in the first set of sub-draw-calls that overlap the first screen tile and a second plurality of sub-draw-calls included in the second set of sub-draw-calls that overlap the first screen tile;

storing primitives associated with the first plurality of sub-draw-calls and primitives associated with the second plurality of sub-draw-calls together in a first tiling unit; and flushing the first tiling unit to transmit the primitives associated with the first plurality of sub-draw-calls and the primitives associated with the second plurality of sub-draw-calls to a screen-space pipeline to be rendered together in the screen-space pipeline.

12. The non-transitory computer-readable medium of claim 11, wherein flushing the first tiling unit to transmit the primitives associated with the first plurality of sub-draw-calls and the primitives associated with the second plurality of sub-draw-calls to a screen-space pipeline to be rendered together comprises setting a scissor rectangle for the first screen tile.

13. The non-transitory computer-readable medium of claim 11, wherein identifying the first plurality of sub-draw-calls and the second plurality of sub-draw-calls comprises causing a set of bounding boxes to be determined for each sub-draw-call in the first set of sub-draw-calls and each sub-draw-call in the second set of sub-draw-calls.

14. The non-transitory computer-readable medium of claim 13, wherein causing the set of bounding boxes to be determined comprises calculating minimum and maximum screen-space coordinates for each vertex in each sub-draw-call in the first set of sub-draw-calls and each sub-draw-call in the second set of sub-draw-calls.

15. The non-transitory computer-readable medium of claim 14, wherein flushing the first tiling unit to transmit the primitives associated with the first plurality of sub-draw-calls and the primitives associated with the second plurality of sub-draw-calls to a screen-space pipeline to be rendered together further comprises causing a graphics subsystem to determine which sub-draw-calls in the first set of sub-draw-calls and which sub-draw-calls in the second set of sub-draw-calls overlap each bounding box in the set of bounding boxes.

16. The non-transitory computer-readable medium of claim 13, wherein causing the set of bounding boxes to be determined comprises allocating memory for the set of bounding boxes, causing a graphics subsystem to calculate minimum and maximum object-space coordinates for each vertex in each sub-draw-call in the first set of sub-draw-calls and each sub-draw-call in the second set of sub-draw-calls, and causing the graphics subsystem to write the minimum and maximum object-space coordinates into the allocated memory.

17. The non-transitory computer-readable medium of claim 16, wherein flushing the first tiling unit to transmit the primitives associated with the first plurality of sub-draw-calls and the primitives associated with the second plurality of sub-draw-calls to a screen-space pipeline to be rendered together further comprises transmitting a set of commands to the graphics subsystem.

18. The non-transitory computer-readable medium of claim 17, wherein:

the set of commands includes a set of occlusion query commands and a set of conditional render commands, each occlusion query command included in the set of occlusion query commands is configured to transform a different bounding box included in the set of bounding boxes into screen-space coordinates, and test a different sub-draw-call included in the first set of sub-draw-calls and the second set of sub-draw-calls against the transformed bounding box, and the set of conditional render commands is configured to cause sub-draw-calls for which the test for an associated bounding box results in true to be rendered.

19. The non-transitory computer-readable medium of claim 18, wherein the set of conditional render commands is associated with the first screen tile, each occlusion query command is associated with at least one sub-draw-call in the first set of sub-draw-calls or the second set of sub-draw-calls, and each conditional render command is associated with a different occlusion query command.

20. The non-transitory computer-readable medium of claim 11, wherein flushing the first tiling unit to transmit the primitives associated with the first plurality of sub-draw-calls and the primitives associated with the second plurality of sub-draw-calls to a screen-space pipeline to be rendered together comprises:

identifying a first plurality of primitives that includes primitives associated with the first set of sub-draw-calls that overlap a first cache tile and primitives associated with the second set of sub-draw-calls that overlap the first cache tile;

identifying a second plurality of primitives that includes primitives associated with the first set of sub-draw-calls that overlap a second cache tile and primitives associated with the second set of sub-draw-calls that overlap the second cache tile; and transmitting the first plurality of primitives to the screen-space pipeline for processing prior to transmitting the second plurality of primitives to the screen-space pipeline for processing.

21. The computing device of claim 20, wherein flushing the first tiling unit to transmit the primitives associated with the first plurality of sub-draw-calls and the primitives associated with the second plurality of sub-draw-calls to a screen-space pipeline to be rendered processed together comprises setting a scissor rectangle for the first screen tile.

22. The non-transitory computer-readable medium of claim 11, wherein flushing the first tiling unit to transmit the primitives associated with the first plurality of sub-draw-calls and the primitives associated with the second plurality of sub-draw-calls to the screen-space pipeline comprises flushing the first tiling unit when storage in the first tiling unit exceeds a threshold or in response to a flush command.

23. The non-transitory computer-readable medium of claim 11, further comprising:
rearranging primitives associated with the first set of sub-draw-calls and primitives associated with the second set of sub-draw-calls to place the primitives associated with the first plurality of sub-draw-calls proximate to the primitives associated with the second plurality of sub-draw-calls; and
transmitting the primitives associated with the first plurality of sub-draw-calls and the primitives associated with the second plurality of sub-draw-calls to the first tiling unit.

24. A computing device for processing graphics objects, the computing device comprising:
a memory including instructions; and
a processor that is coupled to the memory and, when executing the instructions, is configured to:
receive a first draw-call and a second draw-call;
divide the first draw-call into a first set of sub-draw-calls and the second draw-call into a second set of sub-draw-calls;
identify a first screen tile;
identify a first plurality of sub-draw-calls included in the first set of sub-draw-calls that overlap the first screen tile and a second plurality of sub-draw-calls included in the second set of sub-draw-calls that overlap the first screen tile;
store primitives associated with the first plurality of sub-draw-calls and primitives associated with the second plurality of sub-draw-calls together in a first tiling unit; and
flush the first tiling unit to transmit the primitives associated with the first plurality of sub-draw-calls and the primitives associated with the second plurality of sub-draw-calls to a screen-space pipeline to be rendered together in the screen-space pipeline.

25. The computer device of claim 24, wherein the processor is configured to flush the first tiling unit to transmit the primitives associated with the first plurality of sub-draw-calls and the primitives associated with the second plurality of sub-draw-calls to a screen-space pipeline to be rendered together by:
causing a first plurality of primitives to be identified, wherein the first plurality of primitives includes primitives associated with the first set of sub-draw-calls that overlap a first cache tile and primitives associated with the second set of sub-draw-calls that overlap the first cache tile;
causing a second plurality of primitives to be identified, wherein the second plurality of primitives includes primitives associated with the first set of sub-draw-calls that overlap a second cache tile and primitives associated with the second set of sub-draw-calls that overlap the second cache tile; and
causing the first plurality of primitives to be transmitted to the screen-space pipeline for processing prior to causing the second plurality of primitives to be transmitted to the screen-space pipeline for processing.

* * * * *

UNITED STATES PATENT AND TRADEMARK OFFICE
CERTIFICATE OF CORRECTION

PATENT NO. : 9,779,533 B2
APPLICATION NO. : 14/164441
DATED : October 3, 2017
INVENTOR(S) : Rouslan Dimitrov and Ziyad S. Hakura Page 1 of 1

It is certified that error appears in the above-identified patent and that said Letters Patent is hereby corrected as shown below:

In the Claims

Column 26, Claim 21, Line 66, please delete "processed".

Signed and Sealed this
Fifteenth Day of May, 2018

Andrei Iancu
*Director of the United States Patent and Trademark Office*